US012795077B2

(12) United States Patent
Han et al.

(10) Patent No.: US 12,795,077 B2
(45) Date of Patent: Nov. 10, 2026

(54) OVERLAPPED FILTERING FOR TEMPORALLY INTERPOLATED PREDICTION BLOCKS

(71) Applicant: Google LLC, Mountain View, CA (US)

(72) Inventors: Jingning Han, Santa Clara, CA (US); Bohan Li, Santa Clara, CA (US); Yaowu Xu, Saratoga, CA (US); In Suk Chong, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/927,278

(22) Filed: Oct. 25, 2024

(65) Prior Publication Data

US 2025/0142050 A1 May 1, 2025

Related U.S. Application Data

(60) Provisional application No. 63/593,389, filed on Oct. 26, 2023.

(51) Int. Cl.
*H04N 19/105* (2014.01)
*H04N 19/137* (2014.01)
(Continued)

(52) U.S. Cl.
CPC ......... *H04N 19/105* (2014.11); *H04N 19/137* (2014.11); *H04N 19/159* (2014.11);
(Continued)

(58) Field of Classification Search
CPC .. H04N 19/176; H04N 19/105; H04N 19/132; H04N 19/136; H04N 19/167;
(Continued)

(56) References Cited

U.S. PATENT DOCUMENTS 6,097,854 A 8/2000 Szeliski et al.
6,735,249 B1 5/2004 Karczewicz et al.
(Continued)

FOREIGN PATENT DOCUMENTS

CN 118317106 A * 7/2024 ........... H04N 19/176
EP 3059965 A1 8/2016
(Continued)

OTHER PUBLICATIONS

Rivaz, Peter de, et al., "AV1 Bitstream & Decoding Process Specification", The Alliance for Open Media, last modified Jan. 8, 2019, (681 pages).
(Continued)

*Primary Examiner* — Marnie A Matt
(74) *Attorney, Agent, or Firm* — Young Basile Hanlon & MacFarlane, P.C.

(57) ABSTRACT

Filtering an interpolated reference frame is described. The interpolated reference frame is generated by determining, from a motion field, a motion vector pointing towards a forward reference frame and a motion vector pointing towards a backward reference frame. Expanded prediction blocks, compared to the size of the block of the interpolated reference frame, are determined using the motion vectors and reference frames. The expanded prediction blocks form overlapping areas with adjacent blocks of the interpolated reference frame. The overlapping areas are filtered to mitigate discontinuities.

20 Claims, 8 Drawing Sheets

(51) Int. Cl.
*H04N 19/159* (2014.01)
*H04N 19/172* (2014.01)
*H04N 19/176* (2014.01)
*H04N 19/80* (2014.01)

(52) U.S. Cl.
CPC ......... *H04N 19/172* (2014.11); *H04N 19/176* (2014.11); *H04N 19/80* (2014.11)

(58) Field of Classification Search
CPC .... H04N 19/196; H04N 19/50; H04N 19/503; H04N 19/107; H04N 19/109; H04N 19/11; H04N 19/124; H04N 19/126; H04N 19/513; H04N 19/91
USPC ...................................................... 375/240.12
See application file for complete search history.

(56) References Cited

U.S. PATENT DOCUMENTS

| | | | | |
|---|---|---|---|---|
| 6,816,552 | B2 | 11/2004 | Demos | |
| RE39,279 | E | 9/2006 | Yukitake et al. | |
| 7,149,251 | B2 | 12/2006 | Karczewicz et al. | |
| 7,266,150 | B2 | 9/2007 | Demos | |
| 7,308,145 | B2 | 12/2007 | Abe et al. | |
| 7,492,952 | B2 | 2/2009 | Abe et al. | |
| 7,606,307 | B2 | 10/2009 | Jeon | |
| 7,894,524 | B2 | 2/2011 | Demos | |
| 8,050,323 | B2 | 11/2011 | Demos | |
| 8,111,754 | B1 | 2/2012 | Demos | |
| 8,139,638 | B2 | 3/2012 | Demos | |
| 8,139,639 | B2 | 3/2012 | Demos | |
| 8,139,640 | B2 | 3/2012 | Demos | |
| 8,139,641 | B2 | 3/2012 | Demos | |
| 8,144,774 | B2 | 3/2012 | Demos | |
| 8,149,912 | B2 | 4/2012 | Demos | |
| 8,155,200 | B2 | 4/2012 | Kondo et al. | |
| 8,155,201 | B2 | 4/2012 | Kondo et al. | |
| 8,160,142 | B2 | 4/2012 | Demos | |
| 8,160,149 | B2 | 4/2012 | Demos | |
| 8,184,200 | B1 | 5/2012 | Biswas et al. | |
| 8,213,507 | B2 | 7/2012 | Demos | |
| 8,249,158 | B2 | 8/2012 | Demos | |
| 8,279,929 | B2 | 10/2012 | Demos | |
| 8,290,043 | B2 | 10/2012 | Demos | |
| 8,325,809 | B2 | 12/2012 | Demos | |
| 8,351,503 | B2 | 1/2013 | Jeon | |
| 8,401,078 | B2 | 3/2013 | Demos | |
| 8,477,851 | B2 | 7/2013 | Demos | |
| 8,488,674 | B2 | 7/2013 | Demos | |
| 8,503,529 | B2 | 8/2013 | Demos | |
| 8,654,835 | B2 | 2/2014 | Li et al. | |
| 8,699,572 | B2 | 4/2014 | Demos | |
| 8,761,257 | B2 | 6/2014 | Demos | |
| 8,767,829 | B2 | 7/2014 | Demos | |
| 8,873,629 | B2 | 10/2014 | Demos | |
| 8,942,285 | B2 | 1/2015 | Demos | |
| 8,995,528 | B2 | 3/2015 | Demos | |
| 9,078,002 | B2 | 7/2015 | Demos | |
| 9,386,321 | B2 | 7/2016 | Demos | |
| 9,538,196 | B2 | 1/2017 | Kadono et al. | |
| 10,284,869 | B2 | 5/2019 | Han et al. | |
| 10,511,852 | B1 | 12/2019 | Xu et al. | |
| 10,659,788 | B2 | 5/2020 | Xu et al. | |
| 10,771,803 | B2 | 9/2020 | Han et al. | |
| 11,284,107 | B2 | 3/2022 | Xu et al. | |
| 11,405,631 | B2 | 8/2022 | Han et al. | |
| 11,876,974 | B2 | 1/2024 | Xu et al. | |
| 2004/0252759 | A1 | 12/2004 | John Winder et al. | |
| 2006/0233253 | A1 | 10/2006 | Shi et al. | |
| 2008/0204592 | A1 | 8/2008 | Jia et al. | |
| 2009/0148058 | A1 | 6/2009 | Dane et al. | |
| 2010/0166079 | A1 | 7/2010 | Goel | |
| 2011/0149106 | A1 | 6/2011 | Kino | |
| 2011/0249734 | A1 | 10/2011 | Segall et al. | |
| 2012/0237114 | A1 | 9/2012 | Park et al. | |
| 2013/0070856 | A1 | 3/2013 | Sato | |
| 2013/0114002 | A1 | 5/2013 | Carlsson et al. | |
| 2013/0121416 | A1 | 5/2013 | He et al. | |
| 2014/0037982 | A1 | 2/2014 | Ivanov et al. | |
| 2014/0092978 | A1 | 4/2014 | Bugdayci et al. | |
| 2014/0126643 | A1* | 5/2014 | Park | H04N 19/52 375/240.16 |
| 2014/0269927 | A1 | 9/2014 | Naletov et al. | |
| 2014/0307982 | A1 | 10/2014 | Kanaev et al. | |
| 2015/0078456 | A1 | 3/2015 | Hannuksela | |
| 2015/0181220 | A1 | 6/2015 | Sugio et al. | |
| 2015/0339806 | A1 | 11/2015 | Wu et al. | |
| 2016/0286232 | A1 | 9/2016 | Li et al. | |
| 2017/0094305 | A1 | 3/2017 | Li et al. | |
| 2018/0035127 | A1 | 2/2018 | Fuldseth et al. | |
| 2018/0176574 | A1* | 6/2018 | Tang | H04N 19/543 |
| 2018/0376166 | A1 | 12/2018 | Chuang et al. | |
| 2019/0037237 | A1* | 1/2019 | Suzuki | H04N 19/521 |
| 2019/0058897 | A1 | 2/2019 | Han et al. | |
| 2019/0068991 | A1 | 2/2019 | Xu et al. | |
| 2020/0029071 | A1 | 1/2020 | Kang et al. | |
| 2020/0084457 | A1 | 3/2020 | Abe et al. | |
| 2020/0092576 | A1 | 3/2020 | Li et al. | |
| 2021/0144364 | A1 | 5/2021 | Li et al. | |
| 2022/0360814 | A1 | 11/2022 | Wu et al. | |
| 2022/0385897 | A1* | 12/2022 | Chen | H04N 19/82 |
| 2023/0145364 | A1 | 5/2023 | Park et al. | |

FOREIGN PATENT DOCUMENTS

| | | | | | |
|---|---|---|---|---|---|
| EP | 3139611 | A1 | | 3/2017 | |
| GB | 2488815 | A | | 9/2012 | |
| JP | 2014-511054 | A | | 5/2014 | |
| WO | WO-2013002461 | A1 | * | 1/2013 | H04N 19/52 |
| WO | 2013/159038 | A1 | | 10/2013 | |
| WO | 2017/133661 | A1 | | 8/2017 | |
| WO | WO-2019008255 | A2 | * | 1/2019 | H04N 19/70 |

OTHER PUBLICATIONS

Han, Jingning, et al., "A Technical Overview of AV1", IEEE, arXiv:2008.06091v2 [eess. IV] Feb. 8, 2021 (25 pages).

"Recommendation Itu-T H.265 (v9) (Sep. 2023); Series H: Audiovisual and multimedia systems Infrastructure of audiovisual services—Coding of moving viedo; High Efficiency Video Coding" ITUPublication; 718 pages.

"Series H: Audiovisual and multimedia systems Infrastructure of audiovisual services—Advanced video coding for generic audiovisual services" ITUPublication; Nov. 2007; 538 pages.

Li et al; "Optical Flow Based Co-Located Reference Frame for Video Compression"; IEEE Transactions On Image Processing, vol. 29, 2020 8303; 13 pages.

Grange et al; "VP9 Bitstream & Decoding Process Specification Version 0.6"; Mar. 31, 2016; 171 pages.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

"Introduction to Video Coding Part 1: Transform Coding", Mozilla, Mar. 2012, 171 pp.

"Overview VP7 Data Format and Decoder", Version 1.5, On2 Technologies, Inc, Mar. 28, 2005, 65 pp.

Series H: Audiovisual and Multimedia Systems, Infrastructure of audiovisual services- Coding of moving video, Amendment 2: New profiles for professional applications, International Telecommunication Union, Apr. 2007, 75 pp.

Series H: Audiovisual and Multimedia Systems, Infrastructure of audiovisual services- Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services- Coding of moving video, Advanced video

(56) References Cited

OTHER PUBLICATIONS coding for generic audiovisual services, Version 3, International Telecommunication Union, Mar. 2005, 343 pp.
Bankoski, et al., "Technical Overview of VP8, An Open Source Video Codec for the Web", Jul. 11, 2011, 6 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
Series H: Audiovisual and Multimedia Systems, Infrastructure of audiovisual services- Coding of moving video, Advanced video coding for generic audiovisual services, International Telecommunication Union, Version 11, Mar. 2009. 670 pp.
Series H: Audiovisual and Multimedia Systems, Infrastructure of audiovisual services- Coding of moving video, Advanced video coding for generic audiovisual services, International Telecommunication Union, Version 12, Mar. 2010, 676 pp.
Series H: Audiovisual and Multimedia Systems, Infrastructure of audiovisual services- Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services- Coding of moving video, Advanced video coding for generic audiovisual services, Version 1, International Telecommunication Union, May 2003, 282 pp.
"VP8 Data Format and Decoding Guide, WebM Project", Google On2, Dec 1, 2010, 103 pp.
"VP6 Bitstream and Decoder Specification", Version 1.02, On2 Technologies, Inc, Aug. 17, 2006, 88 pp.
"VP6 Bitstream and Decoder Specification", Version 1.03, On2 Technologies, Inc, Oct. 29, 2007, 95 pp.
Dequing Sun et al., "Learning Optical Flow", ECCV 2008, Part III, LNC 5304; pp. 83-97.
International Search Report and Written Opinion in PCT/US2018/032054, mailed Jul. 23, 2018, 14 pgs.
Yi Chin et al., "Dense true motion field compensation for video coding", 2013 IEEE International Conference on Image Processing, IEEE, (Sep. 15, 2013), pp. 1958-1961.
J. Chen et al., "Algorithm description of Joint Exploration Test Model 7 (JEM7)", Joint Video Exploration Team (JVET) of ITU-T SG 16 WP 3 and ISO/IEC JTC1/SC29/WG11, 7th Meeting, Torino, Italy, Jul. 13-21, 2017 (url: http://phenix.int-evry.fr/jvet/, document No. JVET-G1001 (Aug. 19, 2017), 48 pgs.
Alexander Alshin et al., "Bi-directional Optical Flow for Future Video Codec", 2016 Data Compression Conference (DCC), IEEE, Mar. 30, 2016, pp. 83-90.
A. Alshin et al., "Bi-directional optical flow for improving motion compensation", 2010 Picture Coding Symposium (PCS 2010), Nagoya, Japan, Dec. 8-10, 2010 (IEEE, Piscataway, NJ), pp. 422-425.
U.S. Appl. No. 15/677,220, filed Aug. 15, 2017.
International Search Report and Written Opinion in PCT/US2018/032599, mailed Jul. 23, 2018, 14 pgs.
International Search Report and Written Opinion in PCT/US2018/047223, mailed Nov. 16, 2018, 18 pgs.
Huawei Technologies Co., Ltd., "Affine transform prediction for next generation video coding" ITU-T SG16 Meeting, Oct. 12-23, 2015, Geneva, CH, No. T13-SG16-C-1016 (Sep. 29, 2015), pp. 1-11.
Matthias Narroschke et al., "Extending HEVC by an affine motion model", IEEE 2013 Picture Coding Symposium (PCS), Dec 8, 2013, pp. 321-324.
International Search Report and Written Opinion of International Application No. PCT/US2023/019322, dated Aug. 21, 2023.
X Xiu et al., CE9 5.3: Bi-directional optical flow (BIO) simplification, The Joint Video Exploration Team (JVET) of ISO/IEC JTC1/SC29/WG11 and ITU-TSG16. Meeting Jul. 11-18, 2018, No. JVET-K03443.
Bohan Li et al., "Optical Flow Based Co-Located Reference Frame for Video Compression", IEEE Transactions On Image Processing (IEEE, USA), vol. 29, Aug. 12, 2020, pp. 8303-8315.
Haitao Yang et al., "Subblock-Based Motion Derivation and Inter Prediction Refinement in the Versatile Video Coding Standard", IEEE Transactions On Circuits And Systems For Video Technology (IEEE, USA), vol. 31, No. 10, Jul. 27, 2021, pp. 3862-3877.
International Search Report and Written Opinion of International Application No. PCT/US2024/044347; dated Nov. 28, 2024; 19 pages.
Lu et al.; "Generalized Optical Flow based Motion Vector Refinement in AV1"; 2021 Picture Coding Symposium (PCS); 5 Pages.
Yeqing Wu; "AVM Code Commit"; GitLab; Feb. 1, 2022; 68 pages.

* cited by examiner

OVERLAPPED FILTERING FOR TEMPORALLY INTERPOLATED PREDICTION BLOCKS

CROSS-REFERENCE TO RELATED APPLICATIONS

This application claims priority to and the benefit of U.S. Provisional Patent Application Ser. No. 63/593,389, filed Oct. 26, 2023, the entire disclosure of which is incorporated herein by reference.

BACKGROUND

Digital video streams may represent video using a sequence of frames or still images. Digital video can be used for various applications including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including inter prediction techniques.

SUMMARY

Filtering interpolated reference frame blocks described herein can improve the value of the interpolated reference frame as a prediction frame for inter prediction.

An aspect of the teachings herein is a method for filtering an interpolated reference frame. The method includes determining, for a current frame, a motion field using a first reference frame and a second reference frame and generating an interpolated reference frame. Generating an interpolated reference frame includes, for respective blocks of the interpolated reference frame, determining, from the motion field, a first motion vector pointing toward the first reference frame and a second motion vector pointing toward the second reference frame, generating a first prediction block using the first motion vector and the first reference frame, and generating a second prediction block using the second motion vector and the second reference frame. Each of the first prediction block and the second prediction block is expanded in size compared to the block of the interpolated reference frame such that an overlapping area is formed with at least one adjacent block of the interpolated reference frame. Generating the interpolated reference frame further includes combining the first prediction block and the second prediction block to populate values of the block of the interpolated reference frame and filtering the overlapping area. The method further includes coding a current block of the current frame using inter prediction and the interpolated reference frame.

Another aspect of the teachings herein is a non-transitory, computer-readable storage medium storing a compressed bitstream comprising instructions to perform any of the methods described herein.

Another aspect of the teachings herein is an apparatus comprising a processor configured to determine, for a current frame, a motion field using a first reference frame and a second reference frame, generate an interpolated reference frame, and code a current block of the current frame using inter prediction and the interpolated reference frame. To generate the frame, for respective blocks, the processor is configured to determine, from the motion field, a first motion vector pointing toward the first reference frame, determine, from the motion field, a second motion vector pointing toward the second reference frame, generate a first prediction block using the first motion vector and the first reference frame, generate a second prediction block using the second motion vector and the second reference frame, wherein each of the first prediction block and the second prediction block is expanded in size compared to the block of the interpolated reference frame such that an overlapping area is formed with at least one adjacent block of the interpolated reference frame, combine the first prediction block and the second prediction block to populate values of the block of the interpolated reference frame, and filter the overlapping area.

These and other aspects of this disclosure are disclosed in the following detailed description of the implementations, the appended claims, and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Figure 1:
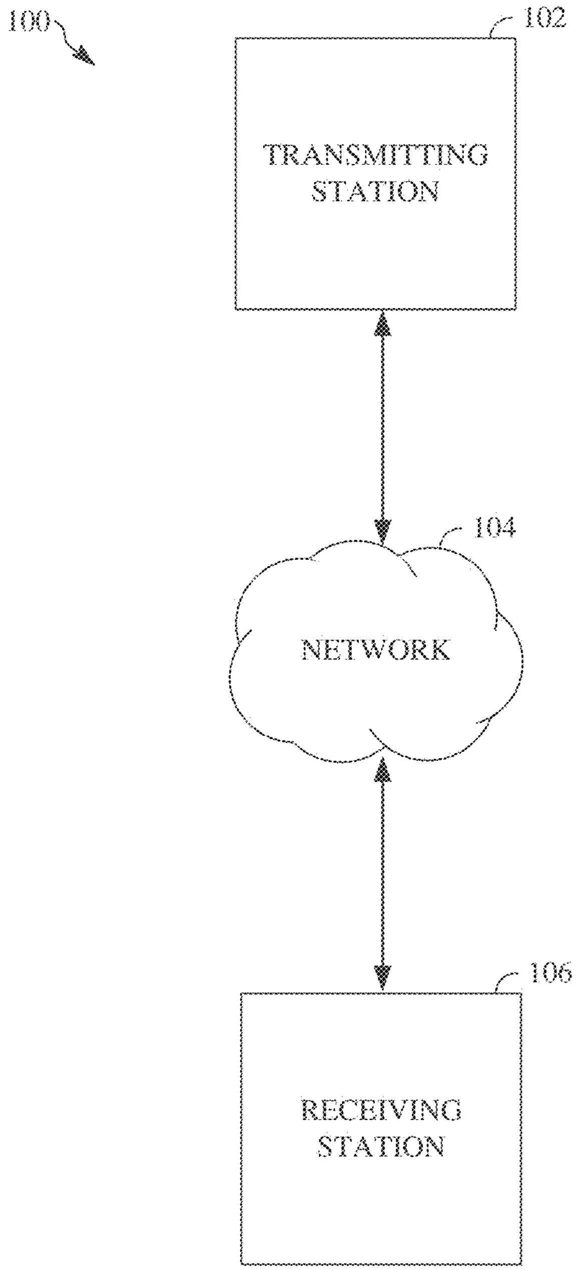
FIG. 1 is a schematic of an example of a video encoding and decoding system.

Video compression schemes may include breaking respective images, or frames, of a video stream into smaller portions, such as blocks, and generating an encoded bitstream by using encoding techniques to limit the information included for respective blocks thereof. The bitstream can be decoded to re-create the source frames from the limited information. A video stream can be compressed (i.e., encoded) by a variety of techniques to reduce bandwidth required to transmit or store the video stream. Similarly, a variety of techniques can be used to decompress (i.e., decode) a compressed video stream from a bitstream, to prepare the video stream for viewing or further processing. Compression of the video stream often exploits spatial and temporal correlation of video signals through spatial and/or motion-compensated prediction. Motion-compensated prediction may also be referred to as inter-prediction. Inter-prediction uses one or more motion vectors to generate a block (also called a prediction block) that resembles a current block to be encoded using previously encoded and decoded pixels. By encoding the motion vector(s), and the difference between the two blocks (i.e., a residual), a decoder receiving the encoded signal can reconstruct the current block by generating the prediction block and adding pixels of the prediction block to the decoded residual block.

Each motion vector used to generate a prediction block in the inter-prediction process refers a reference frame (i.e., a frame other than a current frame which includes the block that is under prediction). Reference frames can be located before or after the current frame in the sequence of the video stream and may be frames that are reconstructed before being used as a reference frame. In particular, a reference frame may be a forward reference frame (i.e., a frame used for forward prediction relative to the sequence) or a backward reference frame (i.e., a frame used for backward prediction relative to the sequence). One or more forward and/or backward reference frames can be used to encode or decode a block. In particular, because many conventional video compression and decompression schemes use a pyramid coding structure to achieve high compression efficiencies, many frames are encoded and decoded using bi-directional prediction, such as using a forward reference frame and a backward reference frame. Bi-directional prediction using forward and backward reference frames has been shown to substantially improve the quality of prediction and thus the overall compression performance for the subject video stream.

Inter prediction may use a temporally interpolated picture reference frame, also referred to as an interpolated reference frame or collocated reference frame (e.g., because the reference frame is temporally located at the same point in the video sequence as the current frame to be encoded or decoded). The interpolated reference frame is a reference frame generated by interpolating reference blocks from a forward reference frame and a backward reference frame (e.g., as the nearest past and future reference frames relative to the current frame). In particular, motion vectors available in the forward and backward reference frames are used to generate a motion field for the current frame. Then, the motion field is used to determine the reference blocks used to generate the interpolated reference frame.

In some implementations, the interpolated reference frame may be used as a directly output display frame, without additional residual coding, to save bits. Additionally, or alternatively, the interpolated reference frame may be used to predict motion of (e.g., blocks of) the current frame as part of inter prediction. In either case, overlapped filtering performed along the block boundaries of the interpolated reference frame can mitigate discontinuities therebetween. Further details of this overlapped filtering are described herein with initial reference to a system in which the teachings herein may be implemented.

While reference is made herein by example to blocks, such as superblocks, macroblocks, and the like, the implementations of this disclosure may be used with other video coding structures. In one particular but non-limiting example, the implementations of this disclosure may be used with coding tree units (CTUs), coding units (CUs), prediction units (Pus), and the like, as are commonly used in video codecs. Accordingly, references herein to particular video coding structures such as blocks like shall be regarded as expressions of non-limiting example video coding structures with which the implementations of this disclosure may be used unless stated otherwise.

FIG. 1 is a schematic of an example of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
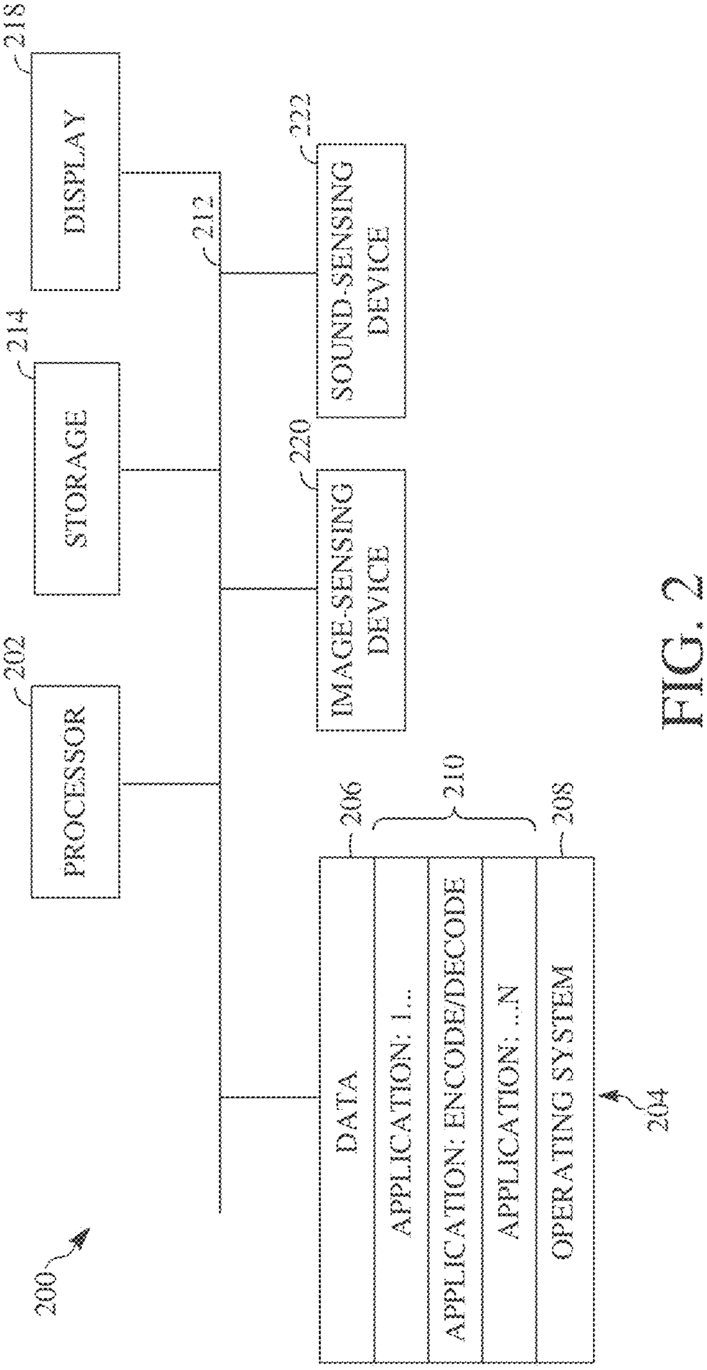
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used such as a video streaming protocol based on the Hypertext Transfer Protocol (HTTP).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

In some implementations, the video encoding and decoding system 100 may instead be used to encode and decode data other than video data. For example, the video encoding and decoding system 100 can be used to process image data. The image data may include a block of data from an image. In such an implementation, the transmitting station 102 may be used to encode the image data and the receiving station 106 may be used to decode the image data.

Alternatively, the receiving station 106 can represent a computing device that stores the encoded image data for later use, such as after receiving the encoded or pre-encoded image data from the transmitting station 102. As a further alternative, the transmitting station 102 can represent a computing device that decodes the image data, such as prior to transmitting the decoded image data to the receiving station 106 for display.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include encoding and/or decoding software that performs, amongst other things, temporally interpolated picture prediction using a frame-level motion vector as described herein.

The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
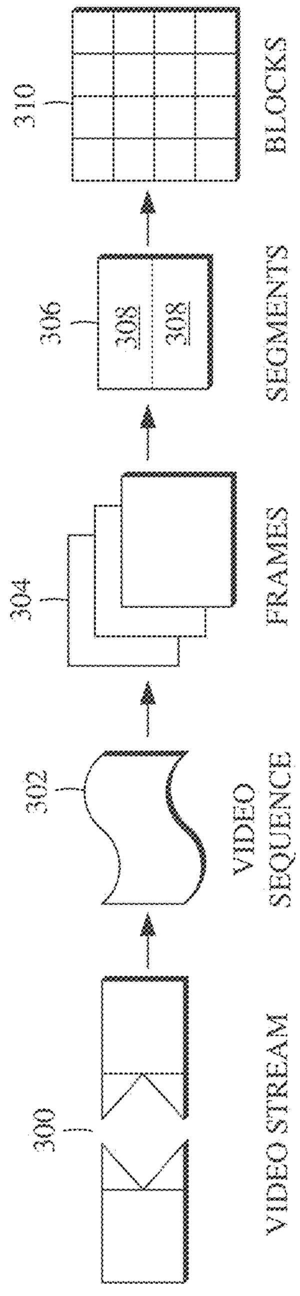
FIG. 3 is a diagram of an example of a video stream to be encoded and decoded.

FIG. 3 is a diagram of an example of a video stream 300 to be encoded and decoded. The video stream 300 includes a video sequence 302. At the next level, the video sequence 302 includes a number of adjacent video frames 304. While three frames are depicted as the adjacent frames 304, the video sequence 302 can include any number of adjacent frames 304. The adjacent frames 304 can then be further subdivided into individual video frames, for example, a frame 306.

At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, N×M pixels in the frame 306, in which N and M may refer to the same integer value or to different integer values. The blocks 310 can also be arranged to include data from one or more segments 308 of pixel data. The blocks 310 can be of any suitable size, such as 4×4 pixels, 8×8 pixels, 16×8 pixels, 8×16 pixels, 16×16 pixels, or larger up to a maximum block size, which may be 128×128 pixels or another N×M pixels size.

Figure 4:
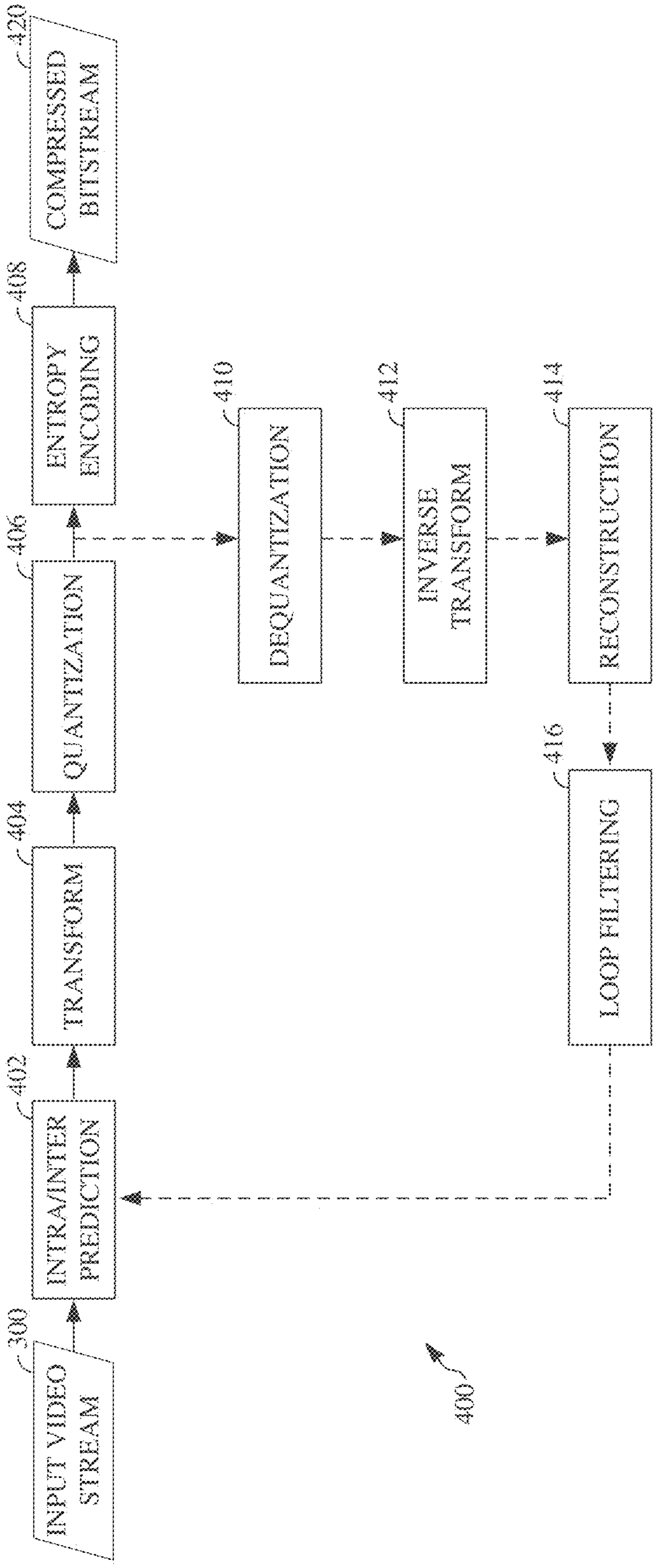
FIG. 4 is a block diagram of an example of an encoder.

FIG. 4 is a block diagram of an example of an encoder 400. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In some implementations, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408.

The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

In some cases, the functions performed by the encoder 400 may occur after a filtering of the video stream 300. That is, the video stream 300 may undergo pre-processing according to one or more implementations of this disclosure prior to the encoder 400 receiving the video stream 300. Alternatively, the encoder 400 may itself perform such pre-processing against the video stream 300 prior to proceeding to perform the functions described with respect to FIG. 4, such as prior to the processing of the video stream 300 at the intra/inter prediction stage 402.

When the video stream 300 is presented for encoding after the pre-processing is performed, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual).

At the reconstruction stage 414, the prediction block that was predicted at the intra/inter prediction stage 402 can be added to the derivative residual to create a reconstructed block. The loop filtering stage 416 can apply an in-loop filter or other filter to the reconstructed block to reduce distortion such as blocking artifacts. Examples of filters which may be applied at the loop filtering stage 416 include, without limitation, a deblocking filter, a directional enhancement filter, and a loop restoration filter.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
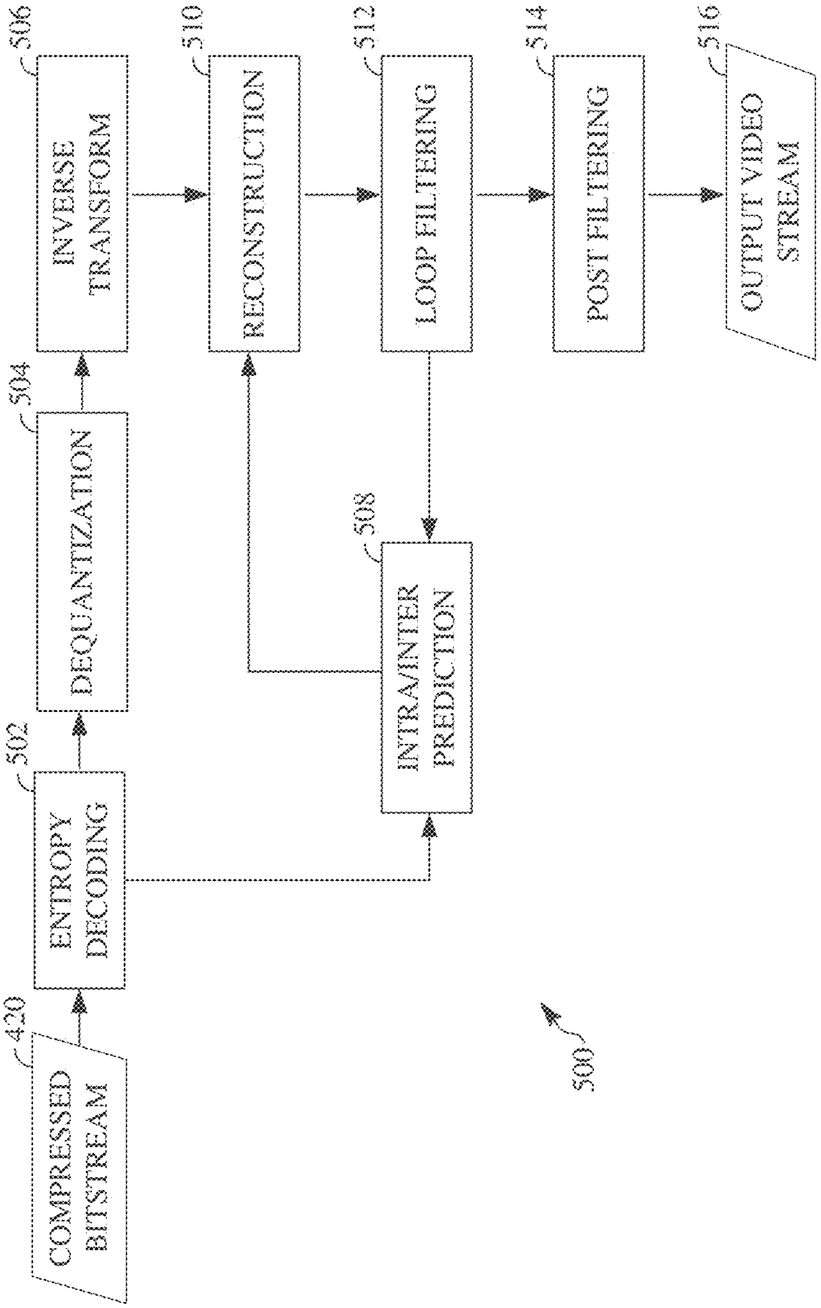
FIG. 5 is a block diagram of an example of a decoder.

FIG. 5 is a block diagram of an example of a decoder 500. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106. In some implementations, the decoder 500 is a hardware decoder.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a post filter stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Examples of filters which may be applied at the loop filtering stage 512 include, without limitation, a deblocking filter, a directional enhancement filter, and a loop restoration filter. Other filtering can be applied to the reconstructed block. In this example, the post filter stage 514 is applied to the reconstructed block to reduce blocking distortion, and the result is output as the output video stream 516. The output video stream 516 can also be referred to as a decoded video stream, and the terms will be used interchangeably herein.

Other variations of the decoder 500 can be used to decode the compressed bitstream 420. In some implementations, the decoder 500 can produce the output video stream 516 without the post filter stage 514 or otherwise omit the post filter stage 514.

Figure 6:
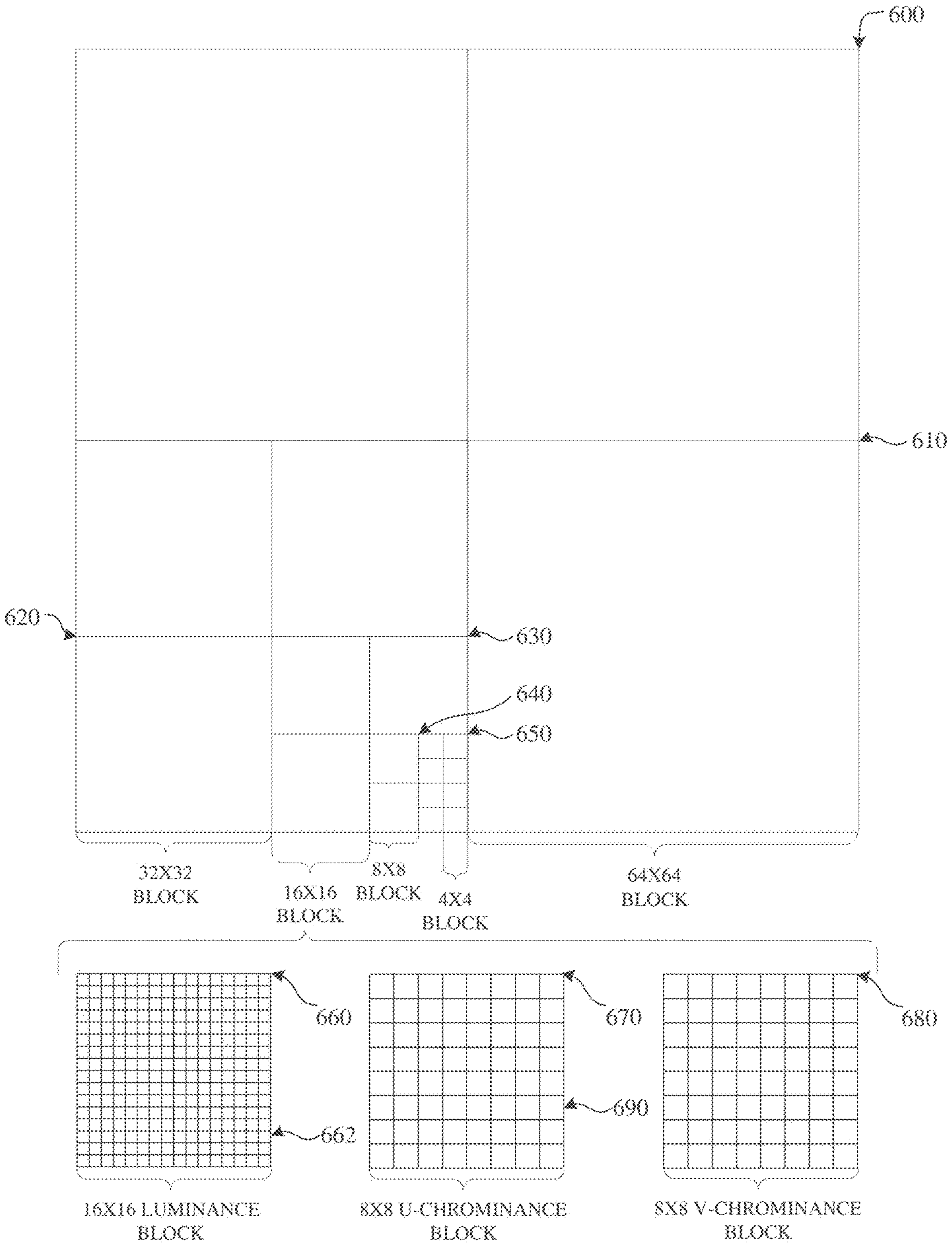
FIG. 6 is an illustration of examples of portions of a video frame.

FIG. 6 is an illustration of examples of portions of a video frame 600, which may, for example, be the frame 306 shown in FIG. 3. The video frame 600 includes a number of 64×64 blocks 610, such as four 64×64 blocks 610 in two rows and two columns in a matrix or Cartesian plane, as shown. Each 64×64 block 610 may include up to four 32×32 blocks 620. Each 32×32 block 620 may include up to four 16×16 blocks 630. Each 16×16 block 630 may include up to four 8×8 blocks 640. Each 8×8 block 640 may include up to four 4×4 blocks 650. Each 4×4 block 650 may include 16 pixels, which may be represented in four rows and four columns in each respective block in the Cartesian plane or matrix. In some implementations, the video frame 600 may include blocks larger than 64×64 and/or smaller than 4×4. Subject to features within the video frame 600 and/or other criteria, the video frame 600 may be partitioned into various block arrangements.

The pixels may include information representing an image captured in the video frame 600, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used, wherein N and M are different numbers. For example, 32×64 blocks, 64×32 blocks, 16×32 blocks, 32×16 blocks, or any other size blocks may be used. In some implementations, N×2N blocks, 2N×N blocks, or a combination thereof, may be used.

In some implementations, coding the video frame 600 may include ordered block-level coding. Ordered block-level coding may include coding blocks of the video frame 600 in an order, such as raster-scan order, wherein blocks may be identified and processed starting with a block in the upper left corner of the video frame 600, or portion of the video frame 600, and proceeding along rows from left to right and from the top row to the bottom row, identifying each block in turn for processing. For example, the 64×64 block in the top row and left column of the video frame 600 may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block of the video frame 600 may include using quad-tree coding, which may include coding smaller block units within a block in raster-scan order. For example, the 64×64 block shown in the bottom left corner of the portion of the video frame 600 may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, coding the video frame 600 may include encoding the information included in the original version of the image or video frame by, for example, omitting some of the information from that original version of the image or video frame from a corresponding encoded image or encoded video frame. For example, the coding may include reducing spectral redundancy, reducing spatial redundancy, or a combination thereof. Reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of the video frame 600, and using a relatively small amount of information to represent each corresponding chrominance component for the portion of the video frame 600. For example, a portion of the video frame 600 may be represented by a high-resolution luminance component, which may include a 16×16 block of pixels, and by two lower resolution chrominance components, each of which represents the portion of the image as an 8×8 block of pixels. A pixel may indicate a value, for example, a value in the range from 0 to 255, and may be stored or transmitted using, for example, eight bits. Although this disclosure is described in reference to the YUV color model, another color model may be used. Reducing spatial redundancy may include transforming a block into the frequency domain using, for example, a discrete cosine transform. For example, a unit of an encoder may perform a discrete cosine transform using transform coefficient values based on spatial frequency.

Although described herein with reference to matrix or Cartesian representation of the video frame 600 for clarity, the video frame 600 may be stored, transmitted, processed, or a combination thereof, in a data structure such that pixel values may be efficiently represented for the video frame 600. For example, the video frame 600 may be stored, transmitted, processed, or any combination thereof, in a two-dimensional data structure such as a matrix as shown, or in a one-dimensional data structure, such as a vector array. Furthermore, although described herein as showing a chrominance subsampled image where U and V have half the resolution of Y, the video frame 600 may have different configurations for the color channels thereof. For example, referring still to the YUV color space, full resolution may be used for all color channels of the video frame 600. In another example, a color space other than the YUV color space may be used to represent the resolution of color channels of the video frame 600.

Figure 7:
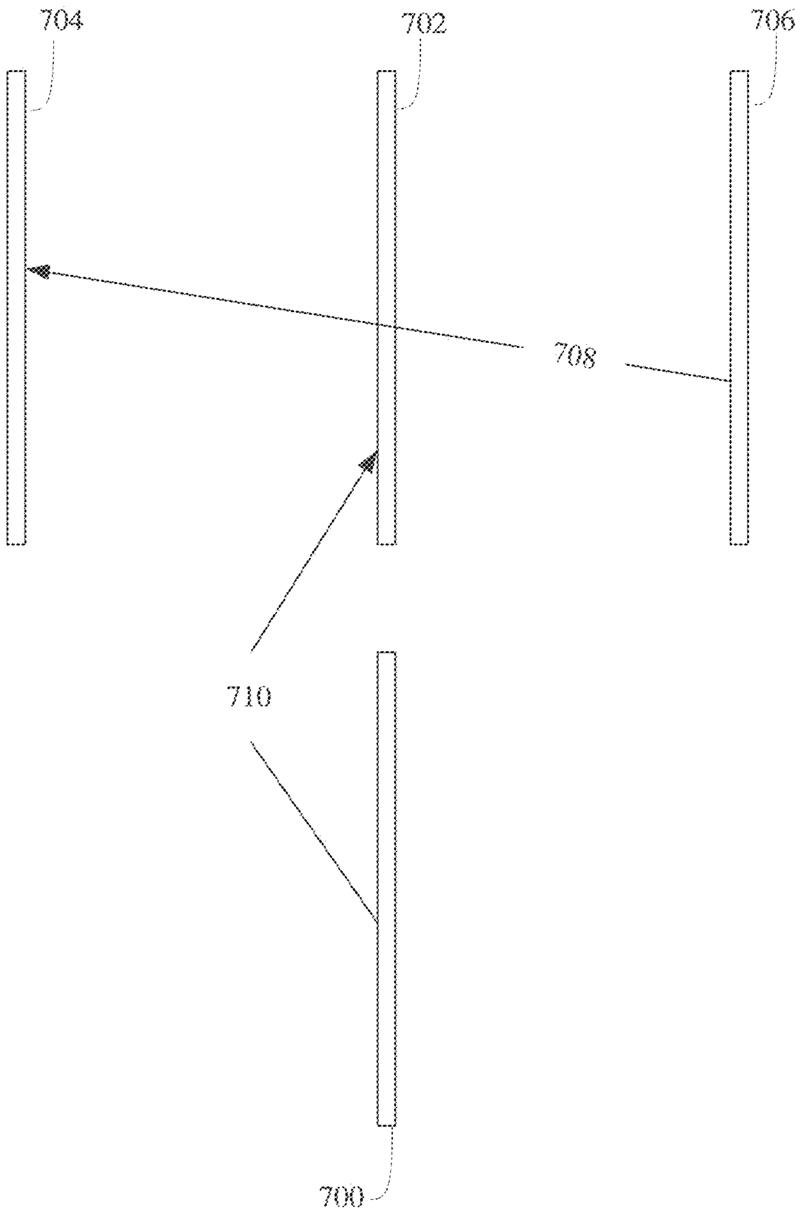
FIG. 7 is an illustration of frames used in connection with temporally interpolated picture video coding.

FIG. 7 is an illustration of frames used to explain video coding using a temporally interpolated reference frame. A current frame 700 represents a frame undergoing prediction using the interpolated reference frame 702, for example, during encoding (e.g., at the intra/inter prediction stage 402) or decoding (e.g., at the intra/inter prediction stage 510). The current frame 700 and the interpolated reference frame 702 are temporally collocated. The interpolated reference frame 702 is generated using a motion field based on a forward reference frame 704 and a backward reference frame 706. For example, where the current frame 700 is denoted as $F_i$, the forward reference frame 704 can be denoted as $F_{i-1}$ and the backward reference frame 706 can be denoted at $F_{i+1}$. A temporal motion vector predictor 708 represents a motion vector predictor pointing from the backward reference frame 706 to the forward reference frame 704. A motion vector 710 pointing from the current frame 700 to the interpolated reference frame 702 represents a motion vector that may be used with the interpolated reference frame 702 to predict the motion within one or more blocks of the current frame 700. For example, the temporal motion vector predictor 708 may be a motion vector predictor for the motion vector 710 that is used to encode or decode the motion vector 710. For example, at an encoder, a difference (e.g., a residual) between the temporal motion vector predictor 708 and the motion vector 710 is encoded into a bitstream for reconstruction by a decoder. At the decoder, the difference (e.g., the residual) may be decoded, along with an identifier of the temporal motion vector predictor 708. Thereafter, the temporal motion vector predictor 708 may be added to the residual to reconstruct the motion vector 710, which can then be used in reconstruction of the current block of the current frame 700.

FIG. 7 is an example and does not limit the use of an interpolated reference frame. The interpolated reference frame may be used for both bi-directional and unidirectional inter prediction. The interpolated reference frame may be used as a display frame, either as an additional frame or in place of a frame (e.g., the current frame).

As mentioned, an interpolated reference frame is generated using a motion field based on a forward reference frame and a backward reference frame. One example of the generation of an interpolated reference frame 802 is next described with regards to FIG. 8. In general, the motion field may be determined by projecting motion vectors of previously-coded frames, such as a backward reference frame 804 and a forward reference frame 806, on a block basis. For example, motion vectors of inter-predicted blocks of the backward reference frame 804 are projected towards the interpolated reference frame 802. Similarly, motion vectors used for inter-predicted blocks of the forward reference frame 806 are projected towards the interpolated reference frame 802. The motion field comprising the motion vectors pointing back to the reference frames 804, 806 is then used to obtain blocks for generating the interpolated reference frame 802.

Figure 8:
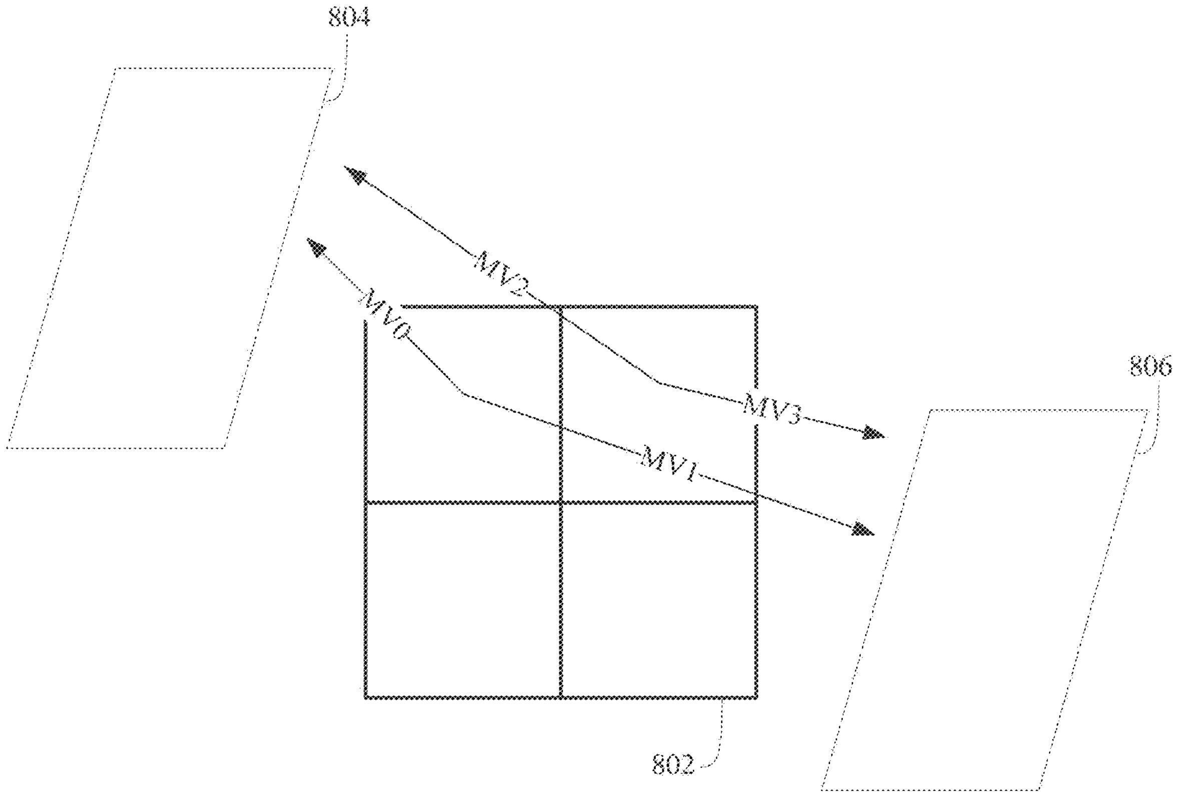
FIG. 8 is an illustration of a first technique of generating an interpolated reference frame.

As seen in FIG. 8, the motion field indicates a motion vector MV0 pointing to the backward reference frame 804 for a block0 of the current frame (and hence the interpolated reference frame 802) and a motion vector MV1 pointing to the forward reference frame 806 for the block0 of the interpolated reference frame 802. The block of the backward reference frame 804 identified by the motion vector MV0 and the block of the forward reference frame 806 identified by the motion vector MV1 may be combined to form values of the block0. Similarly, the motion field indicates a motion vector MV2 pointing to the backward reference frame 804 for a block1 of the interpolated reference frame 802 and a motion vector MV3 pointing to the forward reference frame 806 for the block1 of the interpolated reference frame 802. The block of the backward reference frame 804 identified by the motion vector MV2 and the block of the forward reference frame 806 identified by the motion vector MV3 may be combined to form values of the block1. The pixel values of the blocks from the reference frames may be averaged or combined in any other way as long as the encoder and decoder each use the same technique. In this way, the interpolated reference frame 802 may be built on a block basis. Where the motion field determined using does not identify a motion vector for a block of the interpolated reference frame 802, the block may be excluded from inter prediction as described with regards to FIG. 7. Alternatively, one or more nearby motion vectors (e.g., determined via Manhattan distance) from the motion field may be used to populate the block.

One drawback to this technique is that when identifying two consecutive (e.g., spatially adjacent) blocks of the interpolated reference frame, a discontinuity may exist at the block boundary. For example, a block boundary between the block0 and the block1 may have a discontinuity. A discontinuity exhibits a relatively abrupt change in pixel values between the blocks. One consequence of such a discontinuity can be a reduction in compression efficiency. That is, the discontinuity may present undesired high frequency components in a prediction block for a current block (e.g., a prediction block that overlaps pixels of the two adjacent blocks). This can increase compression costs. Mitigating this discontinuity, thereby improving compression efficiency, is next described with regards to FIG. 9.

Figure 9:
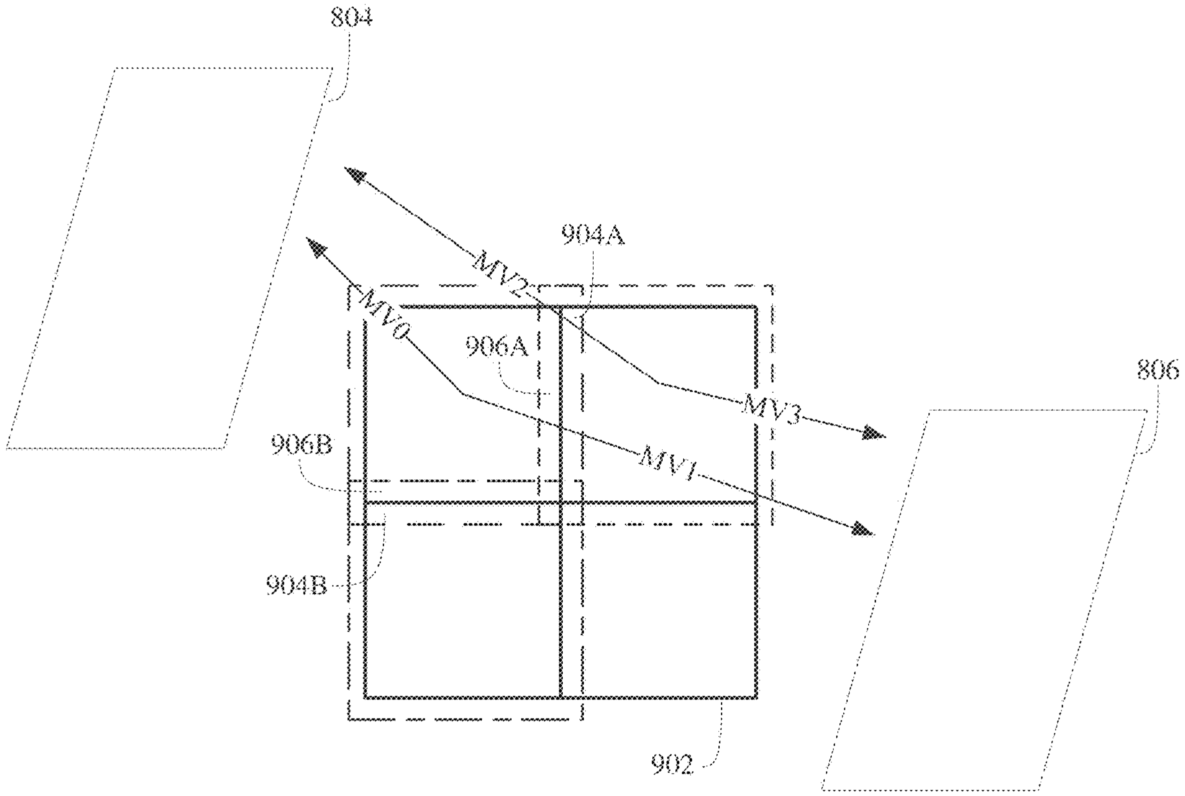
FIG. 9 is an illustration of a second technique of generating an interpolated reference frame.

FIG. 9 is an illustration of a second technique of generating an interpolated reference frame 902. FIG. 9 uses the backward reference frame 804 and the forward reference frame 806 shown in FIG. 8 for generating the interpolated reference frame 902. Instead of using the motion vectors of the motion field of the current frame, such as the motion vectors MV0, MV1, MV2, and MV3, to determine respective predicted blocks from the reference frames having the same sizes as the blocks of the current reference frame and hence the interpolated reference frame, the blocks from the reference frames are expanded to generate an overlapped area at the block boundaries (e.g., expanded in size compared to the blocks of the interpolated reference frame). In FIG. 9, the expanded blocks associated with each of the block0 and the block1 are shown. For example, if the block0 has a size of 8×8 pixels, the size of the block from the backward reference frame 804 and the block from the forward reference frame 806 may have a size larger than 8×8 pixels, for example, 10×10 pixels or 12×12 pixels. This results in a column of pixels 904A that overlaps (e.g., that are collocated) with pixels of the block1 by one or two pixels and a row of pixels 904B that overlaps with pixels of the block below the block0 by one or two pixels. Similarly, this results in a column of pixels 906A that overlaps (e.g., that are collocated) with pixels of the block0 by one or two pixels and a row of pixels 906B from the block below the block0 that overlaps with pixels of the block0 by one or two pixels. Multiple overlaps along the same boundary may be combined to form an overlapping area. For example, along the boundary between the block0 and the block1, the column of pixels 904A and the column of pixels 906A may be combined to form an overlapping area that overlaps (e.g., that are collocated) with pixels of the block0 and the block1 by two or four pixels (e.g., an overlapping area that is two or four pixels in the horizontal direction). In another example, along the boundary between the block0 and the block below the block0, the row of pixels 904B and the row of pixels 906B may be combined to form an overlapping area that overlaps (e.g., that are collocated) with pixels of the block0 and the block below the block0 by two or four pixels (e.g., an overlapping area that is two or four pixels in the vertical direction).

The expanded size of the predicted blocks may be predefined between the encoder and decoder. Multiple predefined sizes may be available between the encoder and decoder, and the decoder may select from one of the available sizes (e.g., based on block size before expansion or on a fixed value such as two or four pixels from the original block size). Alternatively, the expanded size of the blocks may be signaled, such as on a frame level basis (e.g., in a frame header) or some other level above the block level. Sizes may vary based on the prediction block (e.g., current block) size. The boundary of two consecutive blocks may have two or more blocks overlapping. For example, the overlapping area at the lower right corner of the block0 and the lower left corner of the block1 comprises four overlapping blocks (i.e., the expanded areas from block0, block1, the block below block0, and the block below block1). Although the examples herein use an expansion that is the same along all boundaries of a predicted block for the interpolated reference frame, this is not necessary. Horizontal boundaries may be extended by more or fewer pixels than vertical boundaries.

The overlapping areas along the block boundaries are then filtered. That is, the boundary pixels for blocks of the interpolated reference frame are constructed by combining (e.g., by applying filtering coefficients to) the overlapping pixel values of the predicted blocks. The number of overlapping pixels, that is, the size of the overlapping area, is not critical, and filtering may be applied to differently sized overlapping areas. For example, where the overlapping area is two pixels in length (e.g., across the boundary line), such as one pixel from the column of pixels 904A and the contiguous one pixel from the column of pixels 906A or one pixel from the row of pixels 904B and the contiguous one pixel from the row of pixels 906B, a four-point (or 4-tap) filter may be used to filter the pixels in the overlapping area. Similarly, where the overlapping area is four pixels in length (e.g., across the boundary line), such as two pixels from the column of pixels 904A and the contiguous two pixels from the column of pixels 906A or two pixels from the row of pixels 904B and the contiguous two pixels from the row of pixels 906B, an eight-point (or 8-tap) filter may be used to filter the pixels in the overlapping area.

The filter may be applied across the rows and then across the columns or may be applied across the columns and then across the rows. For example, and with reference to FIG. 9, a filter may be applied to respective rows of two or four pixels along the columns of pixels 904A, 906A. Thereafter, the same filter or a different filter may be applied to respective columns of two or four pixels along the rows of pixels 904B, 906B as filtered. Alternatively, a filter may be applied to respective columns of two or four pixels along the rows of pixels 904B, 906B. Thereafter, the same filter or a different filter may be applied to respective rows of two or four pixels along the columns of pixels 904A, 906A as filtered. The expanded areas falling outside of the frame boundaries (e.g., to the left and above the block0 in FIG. 9) may be ignored in this process.

The type of filter is not particularly limited although a low-pass finite impulse response filter is preferable. A filter that reduces inter-symbol interference, such as a raised-cosine filter, may be used. The filter coefficients may be selected according to techniques known to those skilled in the art depending upon, for example, the resolution of the block, the pixel precision and/or values, the number or cardinality of overlapping pixels across the boundary column or row, etc. In an example, a four-point raised-cosine filter may have filter coefficients of {39, 50, 59, 64}/64. In an example, an eight-point raised-cosine filter may have filter coefficients of {36, 42, 48, 53, 57, 61, 64, 64}/64. As described in the example above, the same filters (e.g., the same filter coefficients) or different filters (e.g., different filter coefficients) may be used.

Like the expanded size of the predicted blocks, the filter coefficients may be predefined between the encoder and decoder. Multiple sets of filter coefficients may be predefined, and an identifier, such as an index into a table comprising the multiple sets, may be signaled to indicate which filter coefficients to use. Alternatively, the filter coefficients may be signaled from the encoder to the decoder (e.g., in the bitstream).

Figure 10:
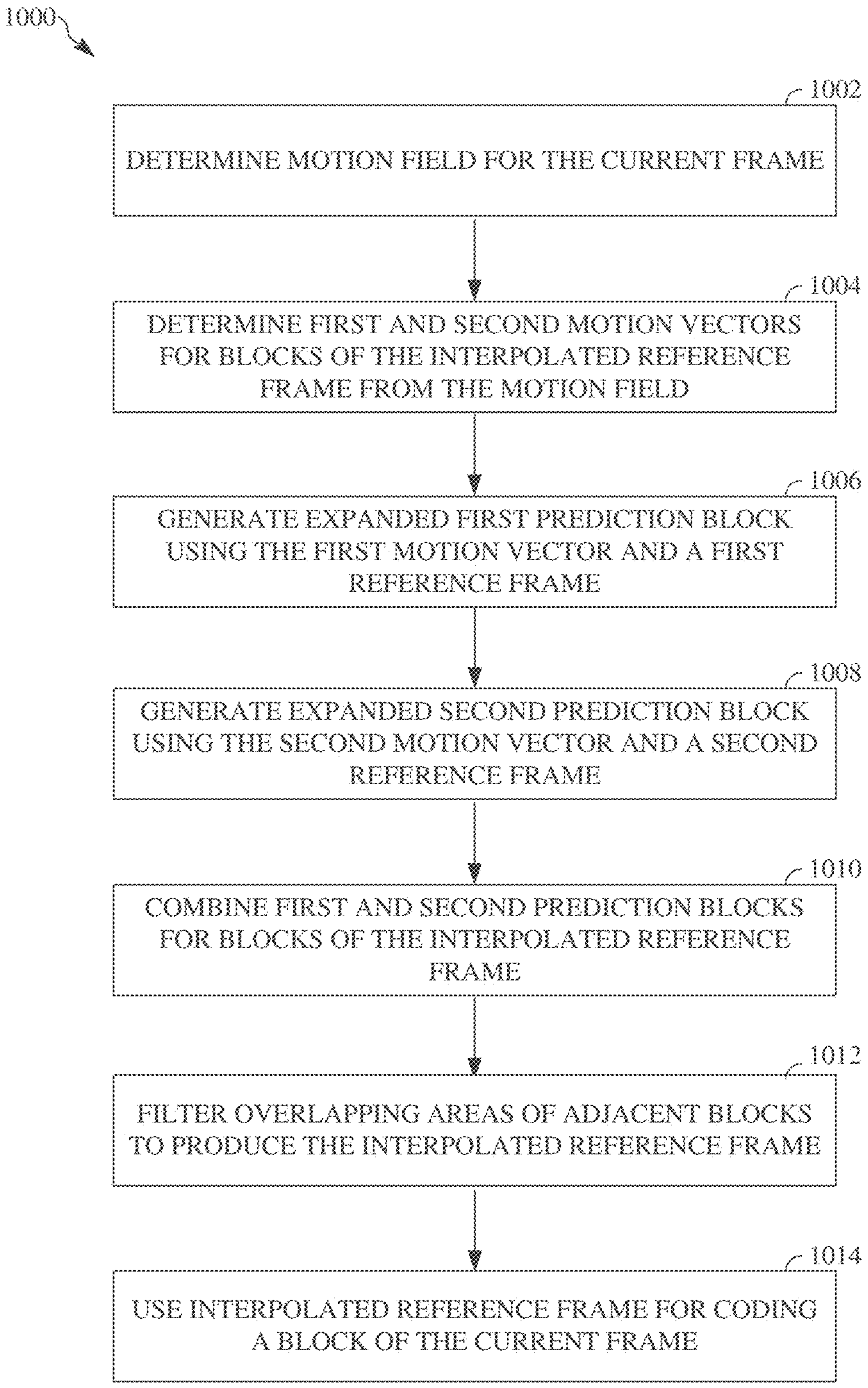
FIG. 10 is a flowchart diagram of an example of a technique for coding using an interpolated reference frame generated using overlapped filtering of blocks.

FIG. 10 is a flowchart diagram of an example of a method or technique 1000 for coding using an interpolated reference frame generated using overlapped filtering of blocks. The technique 1000 may, for example, be wholly or partially performed at a prediction stage of an encoder used to encode a video stream (e.g., the intra/inter prediction stage 402) or may, for example, be wholly or partially performed at a prediction stage of a decoder used to decode a bitstream (e.g., the intra/inter prediction stage 508).

The technique 1000 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 1000. The technique 1000 can be implemented using specialized hardware or firmware. For example, a hardware component, such as a hardware coder, may be configured to perform the technique 1000. As explained above, some computing devices may have multiple memories or processors, and the operations described in the technique 1000 can be distributed using multiple processors, memories, or both. For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The technique 1000 determines a motion field for the current frame at operation 1002. Determining the motion field includes identifying a first reference frame as a backward reference frame for the current frame and a second reference frame as a forward reference frame for the current frame and then projecting motion vectors of the first reference frame and the second reference frame through or otherwise towards the current frame. The particular technique for determining the motion field, and hence the motion vectors, for the current frame are not particularly limited. That is, any technique may be used such as one that assumes linear motion between frames, one that calculates per-pixel motion and from that per-block motion, etc. In theory, such techniques result in good predictors from each of the first reference frame and the second reference frame for blocks of the current frame.

The motion vectors defined by the motion field are next used starting at operation 1004 to generate the interpolated reference frame. Specifically, and as described above, first and second motion vectors are determined for at least some blocks of the current frame. Then, those motion vectors are used to generate respective prediction blocks from the first reference frame and the second reference frame at operations 1006 and 1008, respectively, to generate the interpolated reference frame. The expanded first prediction block for a respective block of the interpolated reference frame is generated or determined using the first motion vector and the expansion size at operation 1006. The expanded second prediction block for the respective block of the interpolated reference frame is generated or determined using the second motion vector and the expansion size at operation 1008.

At operation 1010, the first and second prediction block for the block of the interpolated reference frame are combined to determine values for the block of the interpolated reference frame. All pixels of each prediction block may be combined, including those in the expanded areas that overlap. For example, combining the first prediction block and the second prediction block can include averaging spatially corresponding values of the first prediction block and the second prediction block (i.e., average spatially corresponding or collocated pixel values) such that the resulting block includes those averaged values. In another example, those spatially corresponding values of the first prediction block and the second prediction block can be weighted according to distances between the first reference frame and the current frame and between the second reference frame and the current frame. For example, a higher (e.g., stronger) weight may be applied (e.g., multiplied against) a value of one prediction block based on the corresponding reference frame being closer to the current frame than the other reference frame.

At operation 1012, the overlapping areas for adjacent blocks are filtered as described above to generate a final interpolated reference frame.

At operation 1014, the interpolated reference frame is used for coding (using inter prediction) at least one block of the current frame. At the encoder, this can include performing a motion search against a current block of the current frame using the interpolated reference frame. For example, the motion search can be performed as part of a motion estimation operation that uses rate-distortion optimization to determine motion for the current block. Then, the motion vector so determined is used to generate a prediction block for the current block that determines a prediction residual to encode for the current block. The prediction residual can be encoded into a bitstream as described with regards to FIG. 4, for example. The motion vector can also be encoded in connection with the compressed current block data within the bitstream. At a decoder, operation 1014 includes reconstruction of the current block using the interpolated reference frame. Reconstruction of the current block includes adding the prediction block determined by the motion vector and the interpolated reference frame to a prediction residual of the current block decoded from the bitstream. For example, data associated with the current block and signaled within the encoded bitstream may be entropy coded to produce quantized transform coefficients, dequantized to produce transform coefficients, and inverse transformed to produce the prediction residual, which may then be combined with the prediction block as described above with regards to FIG. 5.

Although the technique 1000 describes combining the first and second blocks at operation 1010 before filtering the overlapping areas at operation 1012, this is not necessary. The overlapping areas of the respective expanded first and second prediction blocks of adjacent blocks may be filtered first. For example, overlapping areas of blocks generated using the first reference frame may be filtered, and overlapping areas of blocks generated using the second reference frame may be filtered. Thereafter, the first and second prediction blocks with the filtered pixel values can be combined.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of this disclosure may be implemented using an apparatus having a processor. Implementations of the transmitting station 102 and/or the receiving station 106 (and the algorithms, methods, instructions, etc., stored thereon and/or executed thereby, including by the encoder 400 and the decoder 500, or another encoder or decoder as disclosed herein) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102 can encode content into an encoded video signal and transmit the encoded video signal to the communications device. In turn, the communications device can then decode the encoded video signal. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device.

Further, all or a portion of implementations of this disclosure can take the form of a computer program product accessible from, for example, a non-transitory_computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method, comprising:

determining, for a current frame, a motion field using a first reference frame and a second reference frame;

generating an interpolated reference frame by, for respective blocks of the interpolated reference frame:

determining, from the motion field, a first motion vector pointing toward the first reference frame;

determining, from the motion field, a second motion vector pointing toward the second reference frame;

generating a first prediction block using the first motion vector and the first reference frame;

generating a second prediction block using the second motion vector and the second reference frame, wherein each of the first prediction block and the second prediction block is expanded in size compared to the block of the interpolated reference frame such that an overlapping area is formed with at least one adjacent block of the interpolated reference frame;

combining the first prediction block and the second prediction block to populate values of the block of the interpolated reference frame; and filtering the overlapping area; and encoding or decoding a current block of the current frame using inter prediction and the interpolated reference frame.

2. The method of claim 1, wherein the filtering the overlapping area comprises:

applying a first filter across rows of the overlapping area; and applying a second filter across columns of the overlapping area.

3. The method of claim 2, wherein filter coefficients used for the first filter and the second filter are same filter coefficients.

4. The method of claim 2, wherein filter coefficients used for the first filter and the second filter are predefined between an encoder and a decoder.

5. The method of claim 4, wherein multiple sets of filter coefficients are predefined, and an identifier is signaled to indicate which filter coefficients to use.

6. The method of claim 1, wherein the filtering the overlapping area uses a low-pass finite impulse response filter.

7. The method of claim 1, wherein an expanded size of the first prediction block and the second prediction block is predefined between an encoder and a decoder.

8. The method of claim 1, wherein an expanded size of the first prediction block and the second prediction block is signaled on a frame level basis.

9. The method of claim 1, wherein the overlapping area is two pixels or four pixels in length across a boundary line between the respective blocks of the interpolated reference frame.

10. An apparatus, comprising:

a processor configured to:

determine, for a current frame, a motion field using a first reference frame and a second reference frame;

generate an interpolated reference frame by, for respective blocks of the interpolated reference frame:

determine, from the motion field, a first motion vector pointing toward the first reference frame;

determine, from the motion field, a second motion vector pointing toward the second reference frame;

generate a first prediction block using the first motion vector and the first reference frame;

generate a second prediction block using the second motion vector and the second reference frame, wherein each of the first prediction block and the second prediction block is expanded in size compared to the block of the interpolated reference frame such that an overlapping area is formed with at least one adjacent block of the interpolated reference frame;

combine the first prediction block and the second prediction block to populate values of the block of the interpolated reference frame; and filter the overlapping area; and encode or decode a current block of the current frame using inter prediction and the interpolated reference frame.

11. The apparatus of claim 10, wherein to combine the first prediction block and the second prediction block comprises to average spatially corresponding values of the first prediction block and the second prediction block to populate values of the block of the interpolated reference frame.

12. The apparatus of claim 11, wherein to average spatially corresponding values of the first prediction block and the second prediction block comprises to weight the spatially corresponding values according to a distance between the first prediction block and the current frame and a distance between the second prediction block and the current frame.

13. The apparatus of claim 10, wherein to code the current block comprises to decode the current block from a compressed bitstream.

14. The apparatus of claim 10, wherein to code the current block comprises to encode the current block into a compressed bitstream.

15. The apparatus of claim 10, wherein to filter the overlapping area comprises to:

apply a first filter across rows of the overlapping area; and apply a second filter across columns of the overlapping area.

16. The apparatus of claim 15, wherein the processor is configured to apply the first filter before applying the second filter.

17. The apparatus of claim 15, wherein the processor is configured to apply the second filter before applying the first filter.

18. The apparatus of claim 10, wherein to filter the overlapping area comprises to filter the overlapping area using a raised-cosine filter.

19. The apparatus of claim 10, wherein multiple sets of filter coefficients are predefined, the processor is configured to receive an identifier from a compressed bitstream of which filter coefficients to use.

20. A non-transitory, computer-readable storage medium storing a compressed bitstream to that when processed by a processor of a decoding or encoding apparatus, results in the decoding or encoding apparatus performing a method comprising:

determining, for a current frame, a motion field using a first reference frame and a second reference frame;

generating an interpolated reference frame by, for respective blocks of the interpolated reference frame:

determining, from the motion field, a first motion vector pointing toward the first reference frame;

determining, from the motion field, a second motion vector pointing toward the second reference frame;

generating a first prediction block using the first motion vector and the first reference frame;

generating a second prediction block using the second motion vector and the second reference frame, wherein each of the first prediction block and the second prediction block is expanded in size compared to the block of the interpolated reference frame such that an overlapping area is formed with at least one adjacent block of the interpolated reference frame;

combining the first prediction block and the second prediction block to populate values of the block of the interpolated reference frame; and filtering the overlapping area; and encoding or decoding a current block of the current frame using inter prediction and the interpolated reference frame.

* * * * *